(12) United States Patent
Arazaki (10) Patent No.: US 11,227,199 B2
(45) Date of Patent: Jan. 18, 2022

(54) PRINT CONTROL DEVICE, PRINTING METHOD, AND PRINT CONTROL PROGRAM

(71) Applicant: SEIKO EPSON CORPORATION, Tokyo (JP)

(72) Inventor: Shinichi Arazaki, Fujimi-Machi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/177,578

(22) Filed: Feb. 17, 2021

(65) Prior Publication Data

US 2021/0256332 A1 Aug. 19, 2021

(30) Foreign Application Priority Data

Feb. 19, 2020 (JP) .............................. JP2020-026269

(51) Int. Cl.
*G06K 15/02* (2006.01)
*B65H 43/00* (2006.01)
*G06K 15/10* (2006.01)

(52) U.S. Cl.
CPC .......... *G06K 15/1878* (2013.01); *B65H 43/00* (2013.01); *B65H 2515/40* (2013.01); *G06K 15/102* (2013.01)

(58) Field of Classification Search
CPC .. G06K 15/1878; G06K 15/102; B65H 43/00; B65H 2515/40
See application file for complete search history.

(56) References Cited

U.S. PATENT DOCUMENTS 9,183,475 B2 * 11/2015 Akaishi .............. G06K 15/1878
2006/0001728 A1 * 1/2006 Murakami ........... B41J 2/04515
347/194

FOREIGN PATENT DOCUMENTS

JP 2006-015494 A 1/2006

* cited by examiner

*Primary Examiner* — Quang N Vo
(74) *Attorney, Agent, or Firm* — Workman Nydegger (57) ABSTRACT

A print control device includes a storage unit storing a color conversion LUT used for color conversion, a print data generating unit, and a print control unit. The color conversion LUT defines a correspondence relationship between color information of the ink color space, and a combination of temperature information indicating a temperature of the printing medium in the printing unit and color information of an input color space. The print data generating unit generates the print data by referring to the color conversion LUT to convert a combination of the input image data represented by the input color space and the temperature information input from the printing unit. The print control unit causes at least part of the printing by the printing unit to be executed in parallel with the generation of the print data by the print data generating unit.

6 Claims, 5 Drawing Sheets

PRINT CONTROL DEVICE, PRINTING METHOD, AND PRINT CONTROL PROGRAM

The present application is based on, and claims priority from JP Application Serial Number 2020-026269, filed Feb. 19, 2020, the disclosure of which is hereby incorporated by reference herein in its entirety.

BACKGROUND

1. Technical Field

The present disclosure relates to a print control device, a printing method, and a print control program.

2. Related Art

A printing command device is disclosed (see JP-A-2006-15494) that, when a print request is made, generates print data using a lookup table (hereinafter referred to as an LUT) for color conversion in a normal situation, which is when an internal temperature of an inkjet printer is equal to or less than 40° C., and, when the temperature exceeds 40° C., generates the print data using an LUT for color conversion at high temperature after a user selects a subsequent operation.

Viscosity of ink changes depending on the temperature. Thus, the viscosity of ink that is discharged from a printing head and lands on a printing medium is affected by the temperature of the printing medium. Since the extent of spread of the ink that lands on the printing medium, that is, the extent to which the ink covers the printing medium varies depending on the viscosity of the ink, a color of a printing result differs depending on the temperature of the printing medium, and there is thus a problem in that print quality is not stable. Further, in JP-A-2006-15494, processing is necessary to switch the LUT depending on the temperature, from among LUTs prepared in accordance with a plurality of temperatures.

SUMMARY

A print control device according to an aspect of the present disclosure includes a storage unit configured to store a color conversion LUT used for color conversion, a print data generating unit configured to generate print data that is image data represented by a predetermined ink color space, by color converting input image data with reference to the color conversion LUT, and a print control unit configured to cause a printing unit to perform printing on a printing medium, based on the print data. The color conversion LUT defines a correspondence relationship between color information of the ink color space, and a combination of temperature information indicating a temperature of the printing medium in the printing unit and color information of an input color space. The print data generating unit generates the print data by referring to the color conversion LUT to convert a combination of the input image data represented by the input color space and the temperature information input from the printing unit, and the print control unit causes at least a part of the printing by the printing unit to be executed in parallel with the generation of the print data by the print data generating unit.

A printing method according to an aspect of the present disclosure includes a print data generating step of generating print data that is image data represented by a predetermined ink color space, by color converting input image data with reference to a color conversion LUT, and a printing step of performing printing, by a printing unit, on a printing medium, based on the print data. The color conversion LUT defines a correspondence relationship between color information of the ink color space, and a combination of temperature information indicating a temperature of the printing medium in the printing unit and color information of an input color space. In the print data generating step, the print data is generated by referring to the color conversion LUT to convert a combination of the input image data represented by the input color space and the temperature information input from the printing unit, and at least a part of the printing step is executed in parallel with the print data generating step.

A print control program according to an aspect of the present disclosure causes a processor to execute functions including a print data generating function of generating print data that is image data represented by a predetermined ink color space, by color converting input image data with reference to a color conversion LUT, and a print control function of causing a printing unit to perform printing on a printing medium, based on the print data. The color conversion LUT defines a correspondence relationship between color information of the ink color space, and a combination of temperature information indicating a temperature of the printing medium in the printing unit and color information of an input color space. The print data generating function generates the print data by referring to the color conversion LUT to convert a combination of the input image data represented by the input color space and the temperature information input from the printing unit, and the print control function causes at least a part of the printing by the printing unit to be executed in parallel with the generation of the print data by the print data generating unit.

BRIEF DESCRIPTION OF THE DRAWINGS

FIG. 1 is a block diagram schematically illustrating a configuration of a print control device and the like.

DESCRIPTION OF EXEMPLARY EMBODIMENTS

An embodiment of the present disclosure will be described below with reference to each of the accompanying drawings. Note that each of the drawings is merely illustrative for describing a present embodiment. Since each of the drawings is illustrative, proportions and shapes may not be precise, or may not match each other, or some components may be omitted.

1. Device Configuration

Figure 1:
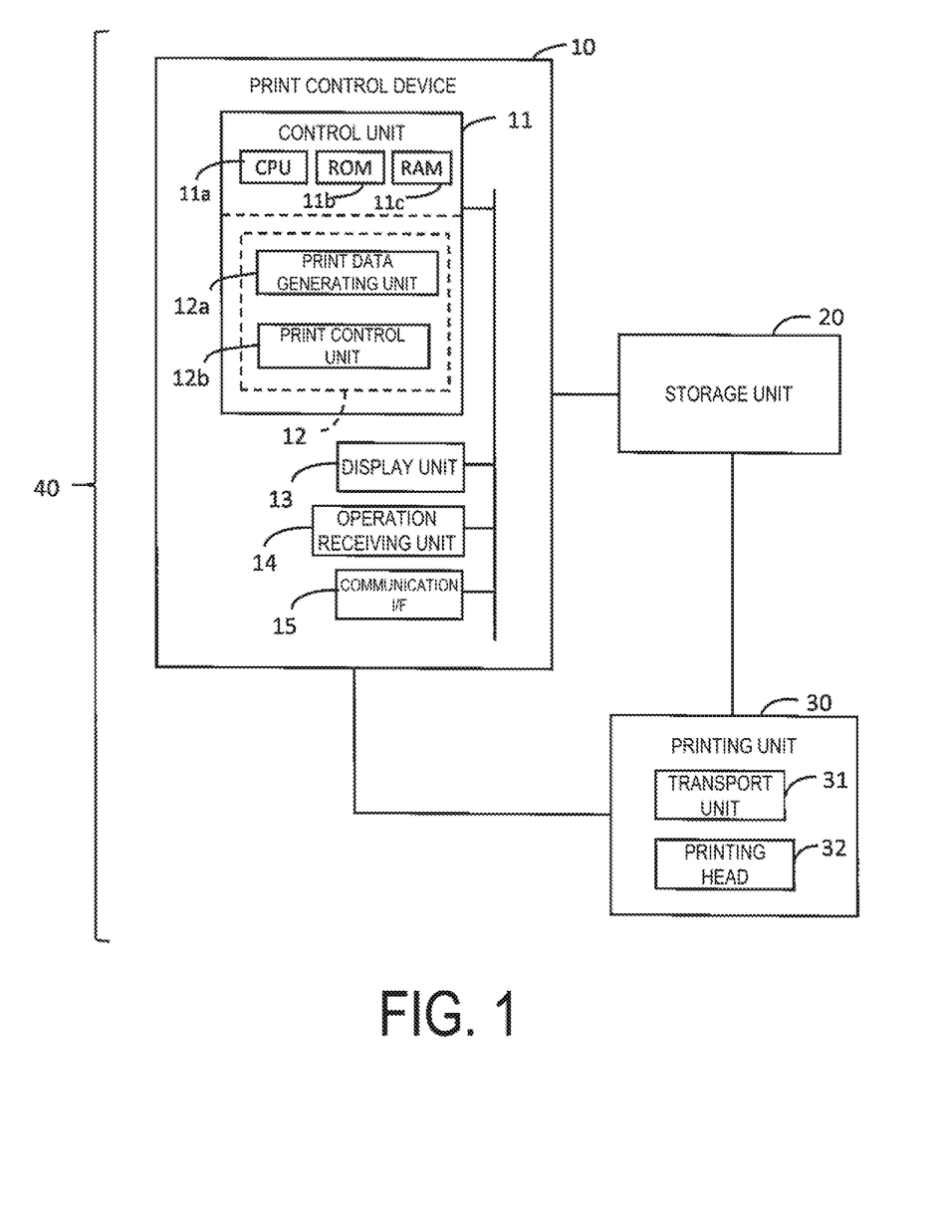

FIG. 1 schematically illustrates a configuration of a printing system 40 according to the present embodiment.

The printing system 40 includes a print control device 10, a storage unit 20, and a printing unit 30. The print control device 10 includes a control unit 11, a display unit 13, an operation receiving unit 14, a communication IF 15, and the like. IF is an abbreviation for interface. The control unit 11 is configured to include one or more ICs including a CPU 11a as a processor, a ROM 11b, a RAM 11c, and the like, and other types of non-volatile memory, and the like.

In the control unit 11, the processor, that is, the CPU 11a, performs various controls by performing arithmetic processing according to one or more programs 12 stored in the ROM 11b, the other memory, or the like, using the RAM 11c or the like as a work area. By following the program 12, the control unit 11 functions as a print data generating unit 12a and a print control unit 12b. The program 12 corresponds to a print control program. Note that the processor is not limited to a single CPU, and a configuration may be adopted in which processing is performed by a plurality of CPUs or by a hardware circuit such as an ASIC, or a configuration may be adopted in which the CPUs and the hardware circuit perform the processing in concert with each other.

The display unit 13 is a device for displaying visual information, and is configured, for example, by a liquid crystal display, an organic EL display, or the like. The display unit 13 may be configured to include a display, and a drive circuit for driving the display. The operation receiving unit 14 is a device for accepting an operation by a user, and is realized, for example, by a physical button, a touch panel, a mouse, a keyboard, or the like. Of course, the touch panel may be realized as a function of the display unit 13.

The display unit 13 and the operation receiving unit 14 may be part of the configuration of the print control device 10, or may be peripheral devices externally coupled to the print control device 10. The communication IF 15 is a generic term for one or more IFs for coupling the print control device 10 to the outside in a wired or wireless manner in accordance with a prescribed communication protocol including a known communication standard.

The storage unit 20 is realized, for example, by a hard disk drive (HDD) or a solid state drive (SSD). The SSD is configured by a flash memory, and performs data reading and writing at higher speeds than the HDD. The ROM 11b and the RAM 11c may be understood to be a part of the storage unit 20.

The printing unit 30 includes a transport unit 31 and a printing head 32. The printing unit 30 performs printing by discharging ink of a plurality of colors, such as cyan (C), magenta (M), yellow (Y), and black (K), onto a printing medium, using an inkjet method. A specific example of the printing unit 30 is described later with reference to FIG. 2.

The print control device 10 and the storage unit 20 may be devices that are independent of each other, or a configuration may be adopted in which the storage unit 20 is provided as a portion of the print control device 10. Further, the print control device 10 may be a system configured by a plurality of devices being communicatively coupled to each other.

When the printing unit 30 is a device independent from the print control device 10 and the storage unit 20, this may be referred to as a printing device, a recording device, an image forming device, a printer, and the like.

Alternatively, the entire printing system 40 may be realized by the single device 40. In other words, it may be understood that the print control device 10, the storage unit 20, and the printing unit 30 are included in a single printing device.

Figure 2:
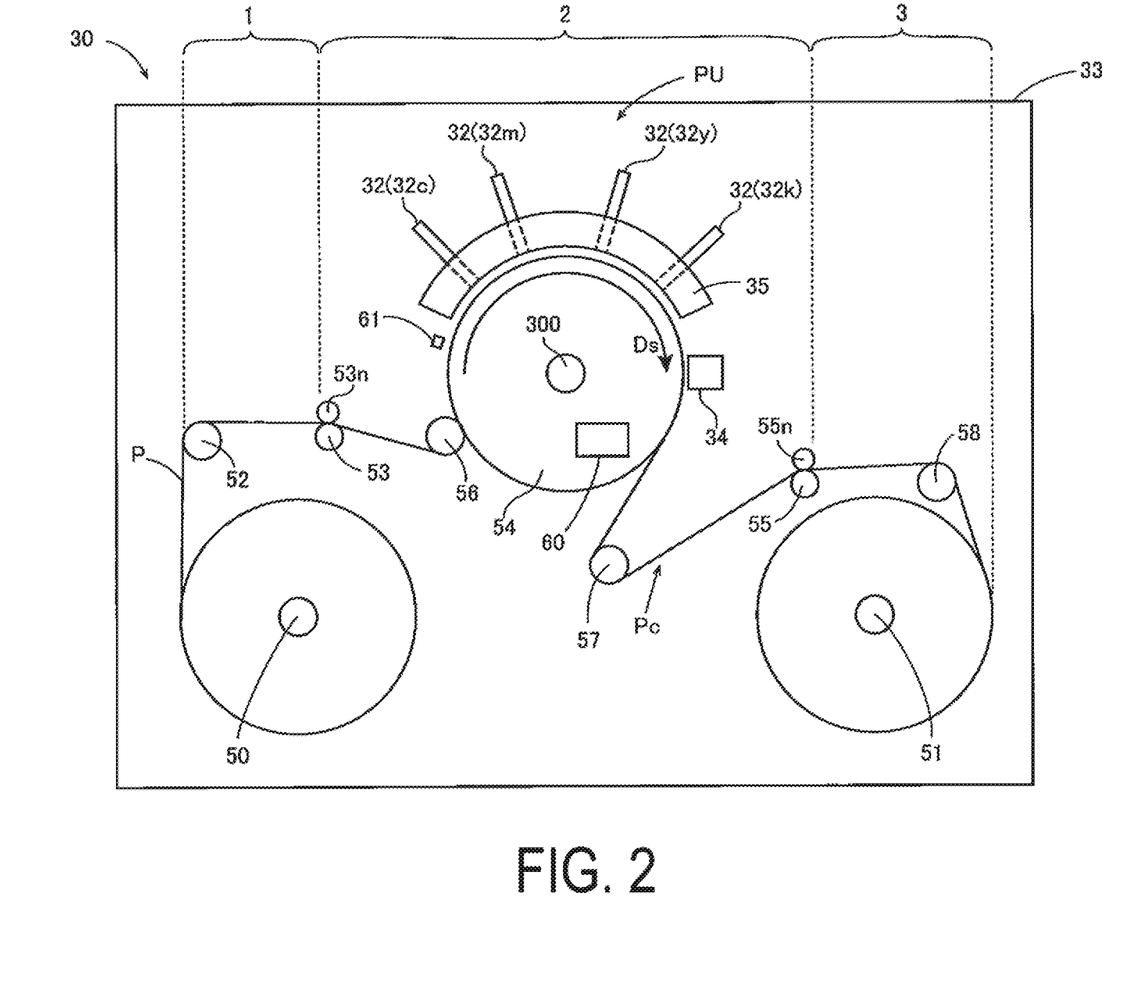
FIG. 2 is a diagram schematically illustrating a configuration of a printing unit.

FIG. 2 illustrates a configuration of the printing unit 30. The printing unit 30 includes a feeding shaft 50 and a winding shaft 51. A single sheet P wound in a roll shape around the feeding shaft 50 and the winding shaft 51 is tensioned along a transport path Pc. The sheet P is the printing medium. Printing is performed on the sheet P while the sheet P is transported from the feeding shaft 50 toward the winding shaft 51 in a transport direction Ds. The transport direction Ds is a direction along the transport path Pc.

In the example illustrated in FIG. 2, the transport path Pc is formed by combining a plurality of straight lines and curved lines, and thus the transport direction Ds is different at each of positions along the transport path Pc. Types of the sheet P are broadly divided into a paper type and a film type. Specific examples of the paper type include high-quality paper, cast-coated paper, art paper, coated paper and the like, and specific examples of the film type include synthetic paper, polyethylene terephthalate (PET), polypropylene (PP) and the like.

The printing unit 30 includes a feeding unit 1 that feeds out the sheet P from the feeding shaft 50, a processing unit 2 that performs the printing on the sheet P fed out from the feeding unit 1, and a winding unit 3 that winds the sheet P printed by the processing unit 2 onto the winding shaft 51. The feeding unit 1, the processing unit 2, and the winding unit 3, which are arranged from left to right in this order in FIG. 2, are housed in a housing 33 of the printing unit 30. On the transport path Pc, the feeding unit 1 is positioned upstream of the processing unit 2 and the winding unit 3. Further, on the transport path Pc, the winding unit 3 is positioned downstream of the feeding unit 1 and the processing unit 2. Hereinafter, upstream and downstream of the transport path Pc are simply referred to as upstream and downstream.

The feeding unit 1 includes the feeding shaft 50, and a driven roller 52 onto which the sheet P pulled out from the feeding shaft 50 is wound. When the feeding shaft 50 is rotated clockwise as illustrated in FIG. 2, the sheet P wound around the feeding shaft 50 is fed out to the processing unit 2 via the driven roller 52. While supporting the sheet P fed out from the feeding unit 1 on a rotating drum 54, the processing unit 2 performs processing as appropriate using a processing unit PU arranged along the outer circumferential surface of the rotating drum 54, and prints an image on the sheet P. In the processing unit 2, a front driving roller 53 is provided upstream of the rotating drum 54, and a rear driving roller 55 is provided downstream of the rotating drum 54. The sheet P transported from the front driving roller 53 to the rear driving roller 55 is supported by the rotating drum 54.

As a result of the front driving roller 53 rotating in the clockwise direction as illustrated in FIG. 2, the sheet P fed out from the feeding unit 1 is transported downstream. Note that a nip roller 53n is provided with respect to the front driving roller 53. The nip roller 53n comes into contact with the sheet P so as to sandwich the sheet P between the nip roller 53n and the front driving roller 53.

The rotating drum 54 is a cylindrically-shaped drum having a center line extending in a direction perpendicular to the plane of the paper in FIG. 2. In the example illustrated in FIG. 2, the rotating drum 54 corresponds to a "support unit" that supports the printing medium. The support unit that supports the printing medium is also referred to as a platen. The rotating drum 54 includes a rotational movement shaft 300 extending in an axis direction along the center line of the cylindrical shape thereof. The rotational movement shaft 300 is rotatably supported by a support mechanism (not illustrated). and the rotating drum 54 rotates about the rotational movement shaft 300. The sheet P transported from the front driving roller 53 to the rear driving roller 55 is wound on the outer circumferential surface of the rotating drum 54. The rotating drum 54 supports the sheet P, while being driven to rotate in the transport direction Ds as a result of a frictional force arising between the rotating drum 54 and the sheet P.

The processing unit 2 is provided with driven rollers 56 and 57 that turn back the sheet P at both of ends of a range of the sheet P wound on the rotating drum 54. The driven roller 56 winds the sheet P between the front driving roller 53 and the rotating drum 54 to turn back the sheet P. The driven roller 57 winds the sheet P between the rotating drum 54 and the rear driving roller 55 to turn back the sheet P. By turning back the sheet P at each of positions upstream and downstream of the rotating drum 54 in this manner, it is possible to secure a long range over which the sheet P is wound onto the rotating drum 54.

The rear driving roller 55 winds the sheet P that has been transported from the rotating drum 54 via the driven roller 57. Then, by rotating clockwise as illustrated in FIG. 2, the rear driving roller 55 transports the sheet P to the winding unit 3. Note that a nip roller 55n is provided with respect to the rear driving roller 55. The nip roller 55n comes into contact with the sheet P so as to sandwich the sheet P between the nip roller 55n and the rear driving roller 55.

The processing unit PU is provided with a plurality of the printing heads 32 and a UV irradiator 34. When distinguishing between each of the printing heads 32, reference numerals 32c, 32m, 32y, and 32k are used as appropriate. Further, the processing unit PU is also provided with a carriage 35. The printing heads 32c, 32m, 32y, and 32k are mounted on the carriage 35. The plurality of printing heads 32 and the UV irradiator 34 are disposed so as to face the outer circumferential surface of the rotating drum 54 along the outer circumference of the rotating drum 54. For example, the printing heads 32c, 32m, 32y, and 32k correspond to the C, M, Y, and K inks, in this order, and ink of the corresponding color can be discharged using the inkjet method. The printing head 32 includes a plurality of nozzles (not illustrated), on an opposing surface facing the outer circumferential surface of the rotating drum 54, and discharges or does not discharge the ink from the nozzles on the basis of the print data. The ink discharged by the nozzles is referred to as an ink droplet and is also referred to as a dot. The printing head 32 may be referred to as a print head, an inkjet head, a liquid discharge head, or the like. Each of the printing heads 32 discharges the ink, and a color image is printed on the sheet P supported by the rotating drum 54.

As the ink used by the printing head 32, an ultraviolet (UV) ink that is cured by being irradiated with ultraviolet rays is used. The UV ink is also referred to as a photocurable ink. Thus, in order to cure the ink that has landed on the sheet P and fix the ink on the sheet P, the processing unit PU is provided with the UV irradiator 34. The UV irradiator 34 irradiates ultraviolet rays from an opposing surface facing the outer circumferential surface of the rotating drum 54. In the example illustrated in FIG. 2, the UV irradiator 34 is disposed downstream of each of the printing heads 32. Accordingly, each of the CMYK inks discharged onto the sheet P from the printing heads 32c, 32m, 32y, and 32k is cured by receiving the ultraviolet rays from the UV irradiator 34.

Taking into account the workability of winding the sheet P around the rotating drum 54, maintenance of the printing heads 32, and the like, the carriage 35 is configured to be movable in a direction along a guide rail (not illustrated) extending in a direction perpendicular to the plane of the paper in FIG. 2. The carriage 35 and the plurality of printing heads 32 mounted on the carriage 35 may be combined and considered to be a single printing head for realizing color printing. The UV irradiator 34 may also be mounted on the carriage 35. A plurality of the UV irradiators 34 may be provided. The sheet P printed by the processing unit 2 is transported to the winding unit 3 by the rear driving roller 55. In addition to the winding shaft 51 around which the end of the sheet P has been wound, the winding unit 3 includes a driven roller 58 that winds the sheet P between the winding shaft 51 and the rear driving roller 55. As a result of the winding shaft 51 rotating clockwise as illustrated in FIG. 2, the sheet P transported from the rear driving roller 55 is wound around the winding shaft 51 via the driven roller 58.

The feeding shaft 50, the winding shaft 51, the rotating drum 54, each of the rollers, and a motor (not illustrated) for appropriately rotating these components configure a specific example of the transport unit 31 that transports the sheet P. A number and arrangement of the rollers provided along the transport path Pc for transporting the sheet P are not limited to the mode illustrated in FIG. 2. Further, the colors of the inks used by the processing unit 2 for printing are not limited to the colors described above.

The temperature of the rotating drum 54 supporting the sheet P may increase due to heat of reaction when the ink on the sheet P is cured by the ultraviolet rays irradiated by the UV irradiator 34. Further, since the sheet P supported by the rotating drum 54 is in contact with the rotating drum 54, the temperature of the sheet P is affected by the temperature of the rotating drum 54. A reference sign 61 in FIG. 2 denotes a temperature sensor 61. The temperature sensor 61 directly or indirectly detects the temperature of the sheet P supported by the rotating drum 54. That is, the temperature sensor 61 may be a sensor that detects the temperature of the sheet P supported by the rotating drum 54 or may be a sensor that detects the temperature of the rotating drum 54 supporting the sheet P. The temperature sensor 61 outputs, to the control unit 11, temperature information T indicating the detected temperature. This type of the temperature information T is information directly or indirectly indicating the temperature of the printing medium in the printing unit 30.

A reference sign 60 denotes a temperature adjustment unit 60. The temperature of the rotating drum 54 changes due to an influence of atmospheric temperature of the environment in which the printing unit 30 is placed and due to the heat of reaction as described above. Since the printing quality on the sheet P supported by the rotating drum 54 is not stable when the temperature of the rotating drum 54 is too low or too high, the printing unit 30 includes the temperature adjustment unit 60 to stabilize the temperature of the rotating drum 54 and the sheet P. The temperature adjustment unit 60 includes a fan capable of cooling the rotating drum 54 by, for example, blowing air onto the rotating drum 54. Further, the temperature adjustment unit 60 may include a heater capable of heating the rotating drum 54.

2. Printing Method

Figure 3:
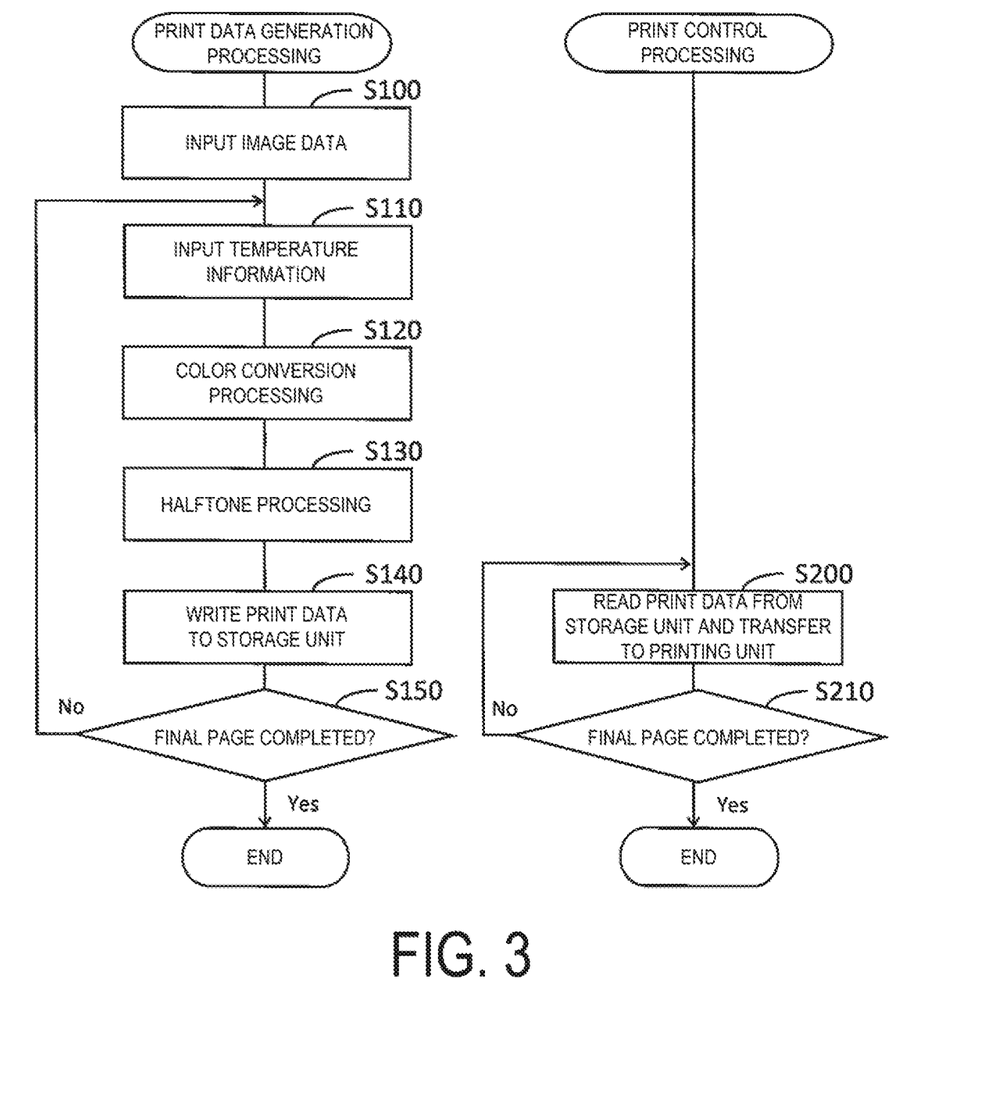
FIG. 3 is a flowchart illustrating a printing method.

FIG. 3 illustrates a printing method according to the present embodiment, using a flowchart. The printing method is realized by the control unit 11 performing processing in accordance with the program 12. In FIG. 3, print data generating processing that generates the print data, and print control processing that uses the generated print data, which configure the printing method, are illustrated in parallel.

At step S100, the print data generating unit 12a inputs an image to be printed. The image to be printed is image data designated as a printing target by a printing command received from the user via the operation receiving unit 14, and represents one or more pages of content. The content referred to here can be, for example, characters, a photo, CG, or the like. The print data generating unit 12a inputs the designated image data from a predetermined storage source of the image data. The image data input at step S100 is referred to as input image data.

The input image data is bitmap data including a plurality of pixels for which color information is defined in a predetermined input color space. Of course, the print data generating unit 12a may convert the format of the input image data at the time of input, as appropriate, and may obtain the bitmap data including the plurality of pixels for which the color information is defined in the predetermined input color space. The input color space is, for example, an RGB (red, green, blue) color space. In this case, the input image data includes color information that is a combination of RGB gray scale values for each of the pixels. The gray scale values of one color are expressed, for example, in 256 gradations of 0 to 255.

At step S110, the print data generating unit 12a inputs the temperature information T from the printing unit 30. In this way, the print data generating unit 12a can input the temperature of the sheet P currently supported by the rotating drum 54 detected by the temperature sensor 61, as in the example illustrated in FIG. 2.

At step S120, the print data generating unit 12a performs color conversion processing on the input image data. The print data generating unit 12a generates image data represented by a predetermined ink color space, by color converting the input image data with reference to a color conversion LUT 80. The color conversion LUT 80 is generated in advance and stored in the storage unit 20. As long as the printing unit 30 is the type using the CMYK inks for printing, as in the example described above, the ink color space is a CMYK color system.

Such color conversion processing is generally performed by referring to a color conversion LUT that defines, for a plurality of RGB data, a correspondence relationship between the RGB data, which is a combination of gray scale values for each of RGB, and ink amount data, which is a combination of gray scale values for each of CMYK.

In contrast, in the present embodiment, the color conversion LUT 80 defines, for a plurality of TRGB data, a correspondence relationship between the TRGB data, which is a combination of the temperature information T and the RGB data, and the color information of the ink color space, namely, the ink amount data. Then, in the color conversion processing, the print data generating unit 12a refers to the color conversion LUT 80, and converts a combination of the RGB data of each of the pixels configuring the input image data, and the temperature information T input at step S110. As a result of the color conversion processing, the image data including the ink amount data for each of the pixels is generated.

Here, the color conversion LUT 80 will be described.

Figure 4:
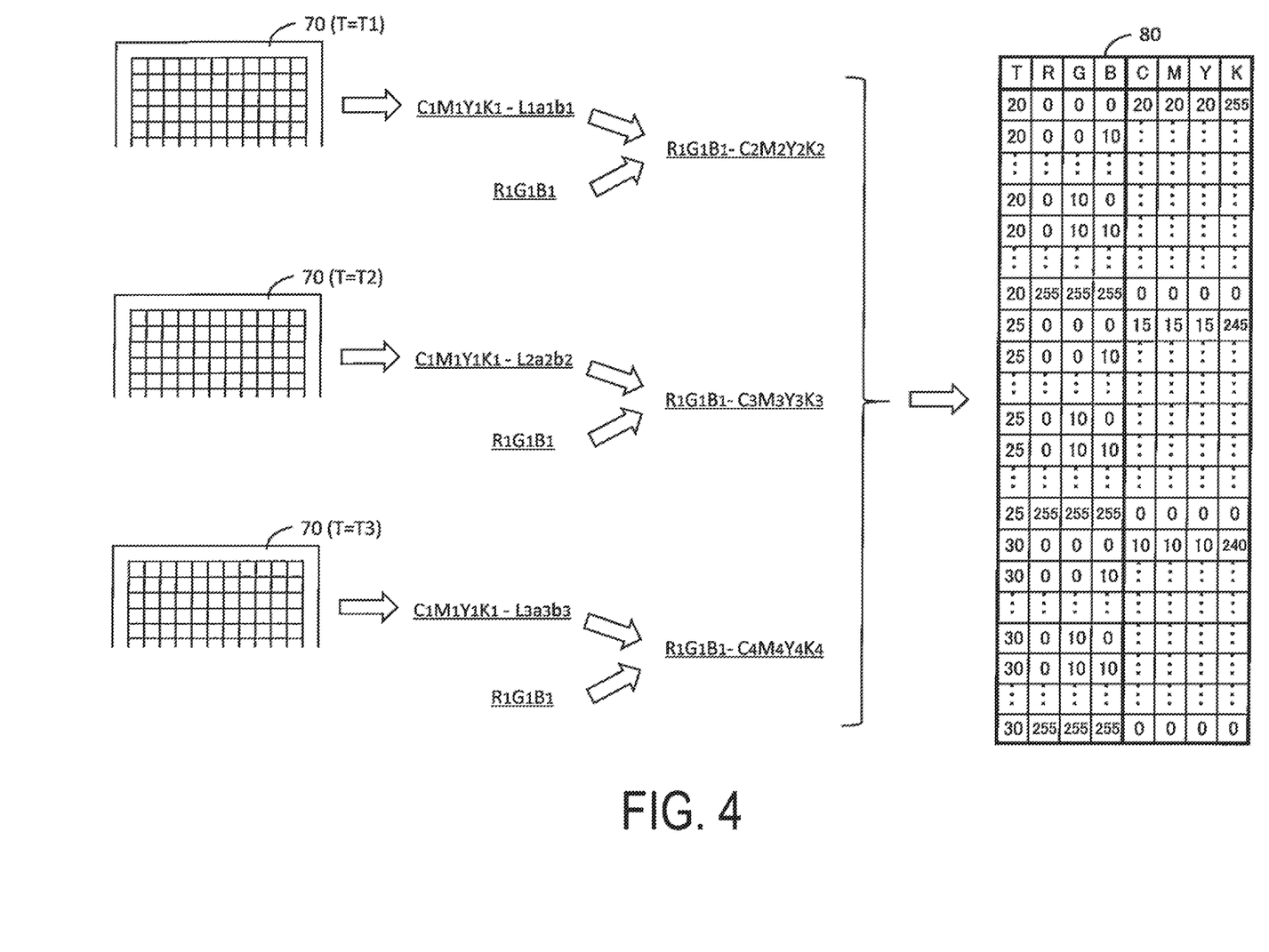
FIG. 4 is a diagram describing an example of a color conversion LUT and a color conversion LUT generating step.

FIG. 4 is a diagram describing an example of the color conversion LUT 80 and a color conversion LUT 80 generating step. The color conversion LUT 80 generating step may be performed in advance by the print control device 10, or may be performed in advance by an information processing device other than the print control device 10. Here, it is assumed that the print control device 10 performs the color conversion LUT 80 generating step. An upper row in FIG. 4 illustrates a portion of a color chart 70 which the printing unit 30 has printed on the sheet P. "T=T1", or the like, marked in parentheses next to the reference sign 70, is the temperature information T when the color chart 70 is printed. In other words, the control unit 11 controls the temperature adjustment unit 60 to create a situation in which the temperature information T is T1, and causes the printing unit 30 to print the color chart 70. The color chart 70 is a collection of a plurality of color patches. In each of the color patches configuring the color chart 70, the colors are respectively defined by the mutually different ink volume data.

Similarly, a middle row in FIG. 4 illustrates a portion of the color chart 70 printed by the printing unit 30 in a situation in which the temperature information T is T2, and a bottom row in FIG. 4 illustrates a portion of the color chart 70 printed by the printing unit 30 in a situation in which the temperature information T is T3. For example, T1 is 20° C., T2 is 25° C., and T3 is 30° C. In other words, the control unit 11 causes the same color chart 70 to be printed on the printing unit 30 in a plurality of different situations in which the temperature information T is different.

The control unit 11 acquires color values for each of the color patches of the printed color chart 70 by measuring the colors of the color chart 70. The color values are, for example, L*a*b* values using the L*a*b* color space defined by the International Commission on Illumination (CIE).

Hereinafter, the notation of "*" is omitted. In FIG. 4, the color value obtained by measuring the color of the color patch of the color chart 70 corresponding to the temperature information T=T1 is described as $L_1a_1b_1$. For convenience, when the ink amount data of each of the color patches is expressed as a unified expression $C_1M_1Y_1K_1$, the control unit 11 obtains the correspondence relationship between the ink amount data $C_1M_1Y_1K_1$ and the color value $L_1a_1b_1$ for each of the number of color patches.

Similarly, in FIG. 4, the color value obtained by measuring the color of the color patch of the color chart 70 corresponding to the temperature information T=T2 is described as $L_2a_2b_2$. The control unit 11 obtains the correspondence relationship between the ink amount data $C_1M_1Y_1K_1$ and the color value $L_2a_2b_2$ for each of the number of color patches. Similarly, in FIG. 4, the color value obtained by measuring the color of the color patch of the color chart 70 corresponding to the temperature information T=T3 is described as $L_3a_3b_3$. The control unit 11 obtains the correspondence relationship between the ink amount data $C_1M_1Y_1K_1$ and the color value $L_3a_3b_3$ for each of the number of color patches.

The color value $L_1a_1b_1$, the color value $L_2a_2b_2$, and the color value $L_3a_3b_3$ corresponding to the same color patch are the colors printed on the basis of the same ink amount data $C_1M_1Y_1K_1$, but, due to the effect of the temperature of the sheet P during the printing, they are different from each other. When the temperature of the printing medium is higher, the further apart the dots that land on the printing medium are spaced and cover the printing medium. Thus, when the temperature of the printing medium is high, the color of the printed result tends to become darker.

On the basis of a lattice point $R_1G_1B_1$ in the RGB color space, and the correspondence relationship between the ink amount data $C_1M_1Y_1K_1$ and the color value $L_1a_1b_1$, the control unit 11 generates a correspondence relationship between the RGB data corresponding to the temperature information T=T1 and the ink amount data. Here, the lattice point $R_1G_1Bd_1$ is a unified expression for a plurality of lattice points interspersed at intervals of a plurality of gray scale values that are constant or substantially constant in the RGB color space. By converting the RGB data of the lattice point $R_1G_1B_1$ to a Lab value using a known conversion formula, the control unit 11 associates the ink amount data with the lattice point $R_1G_1B_1$ in a Lab color space that is not device dependent. In other words, the ink amount data realizing a Lab value that matches or substantially matches the Lab value of the lattice point $R_1G_1B_1$ is determined by interpolation calculation or the like using the correspondence relationship between the ink amount data $C_1M_1Y_1K_1$ and the color value $L_1a_1b_1$. The control unit 11 associates the lattice point $R_1G_1B_1$ obtained via such a Lab color space with the ink data, for each of the lattice points $R_1G_1B_1$. In this way, a correspondence relationship between the lattice point $R_1G_1B_1$ and the ink amount data $C_2M_2Y_2K_2$ is obtained as the correspondence relationship between the RGB data corresponding to the temperature information T=T1 and the ink amount data.

Similarly, on the basis of the lattice point $R_1G_1B_1$ in the RGB color space, and the correspondence relationship between the ink amount data $C_1M_1Y_1K_1$ and the color value $L_2a_2b_2$, the control unit 11 generates a correspondence relationship between the RGB data corresponding to the temperature information T=T2 and the ink amount data. As illustrated in FIG. 4, a correspondence relationship between the lattice point $R_1G_1B_1$ and ink amount data $C_3M_3Y_3K_3$ is obtained as the correspondence relationship between the RGB data corresponding to the temperature information T=T2 and the ink amount data.

Similarly, on the basis of the lattice point $R_1G_1B_1$ in the RGB color space, and the correspondence relationship between the ink amount data $C_1M_1Y_1K_1$ and the color value $L_3a_3b_3$, the control unit 11 generates a correspondence relationship between the RGB data corresponding to the temperature information T=T3 and the ink amount data. As illustrated in FIG. 4, the correspondence relationship between the lattice point $R_1G_1B_1$ and ink amount data $C_4M_4Y_4K_4$ is obtained as the correspondence relationship between the RGB data corresponding to the temperature information T=T3 and the ink amount data.

The control unit 11 stores such correspondence relationships between the temperature information T, the RGB data, and the ink amount data as the single color conversion LUT 80, as illustrated in FIG. 4. In the color conversion LUT 80, T=20 refers to the temperature information T1. Similarly, in the color conversion LUT 80, T=25 refers to the temperature information T2, and T=30 refers to the temperature information T3.

In the color conversion LUT 80, the ink amount data corresponding to TRGB=20, 0, 0, 0, that is, the ink amount data required to reproduce black on the sheet P when the temperature information T is 20° C., is defined as CMYK=20, 20, 20, 255. CMYK=20, 20, 20, 255 defined in this manner is an example of the ink amount data $C_2M_2Y_2K_2$.

Further, in the color conversion LUT 80, the ink amount data corresponding to TRGB=25, 0, 0, 0, that is, the ink amount data required to reproduce black on the sheet P when the temperature information T is 25° C., is defined as CMYK=15, 15, 15, 245. CMYK=15, 15, 15, 245 defined in this manner is an example of the ink amount data $C_3M_3Y_3K_3$.

Further, in the color conversion LUT 80, the ink amount data corresponding to TRGB=30, 0, 0, 0, that is, the ink amount data required to reproduce black on the sheet P when the temperature information T is 30° C., is defined as CMYK=10, 10, 10, 240. CMYK=10, 10, 10, 240 defined in this manner is an example of the ink amount data $C_4M_4Y_4K_4$.

As described above, according to the color conversion LUT 80, the ink amount data required to reproduce the same color on the sheet P varies depending on the temperature information T, and the ink amount tends to be reduced when the temperature information T is high. Therefore, by performing the color conversion processing with reference to the color conversion LUT 80, it is possible to obtain the ink amount data that accurately reproduces the color represented by the RGB on the sheet P for the same RGB regardless of the difference in the temperature information T input at step S110.

The color conversion processing that refers to the color conversion LUT 80 at step S120 is simply processing in which four-dimensional information of the TRGB data is input to the color conversion LUT 80 per pixel, and the ink amount data, which is four-dimensional CMYK information. Needless to say, when the TRGB data of the input matches any of the TRGB values defined in the color conversion LUT 80, the print data generating unit 12*a* may output the CMYK value corresponding to the matching TRGB value as it is, as a conversion result. When the TRGB data of the input does not match any of the TRGB values defined in the color conversion LUT 80, of the TRGB values defined in the color conversion LUT 80, the print data generating unit 12*a* may perform interpolation calculation using the CMYK values corresponding to a number of the TRGB values that approximate the TRGB data input, and output the CMYK value as the conversion result.

At step S130, the print data generating unit 12*a* performs halftone processing on the image data that is generated at step S120 and that includes the ink amount data for each of the pixels. Through the halftone processing, the image data becomes data in which ink discharge (dot on) or ink non-discharge (dot off) is defined for each of the pixels and for each of CMYK. Of course, the dot on information may be information defining which of a plurality of sizes of dots is to be discharged, such as a large dot, a medium dot, or a small dot, for example. The halftone processing can be performed, for example, by a dither method or an error diffusion method. According to such halftone processing, the gray scale value for each of CMYK included in the pixels of the image data is converted from the information of the 256 gray scale representation to binary information or quaternary information.

The image data after the color conversion processing at step S120 and the image data after the halftone processing at step S130 is image data represented in the ink color space, and this image data is referred to as the print data.

At step S140, the print data generating unit 12*a* writes the print data generated by the processing up to step S130, into the storage unit 20.

At step S150, the print data generating unit 12*a* determines whether or not the processing at step 140 is complete up to a final page of the input image data. In other words, when the print data generating unit 12*a* finishes writing the print data into the storage unit 20 for all of the pages configuring the input print data, the print data generating unit 12*a* determines "Yes" at step S150, and ends the print data generation processing. The print data generation processing is also referred to as a print data generating step. On the other hand, when there are pages remaining for which the print data generating unit 12*a* has not finished the processing up to step S140 for the input image data, the print data generating unit 12*a* determines "No" at step S150, and returns to step S110. At step S110 following on from step S150, the print data generating unit 12a once more inputs the latest temperature information T from the printing unit 30 and advances to step S120.

The determination at step S150 is made at various timings. For example, the print data generating unit 12a may make the determination at step S150 each time the writing of the print data for each page configuring the input image data is completed. Alternatively, the print data generating unit 12a may make the determination at step S150 each time the writing of the print data for an image portion having a size smaller than one page is completed.

The print control unit 12b reads the print data written into the storage unit 20 from the storage unit 20, and transfers the print data to the printing unit 30 (step S200). The printing unit 30 that has received the transfer of the print data transports the sheet P at the same time as driving the printing heads 32 on the basis of the transferred print data, thus printing the image represented by the print data on the sheet P. Further, the printing unit 30 drives the UV irradiator 34 to perform ultraviolet irradiation on the ink on the sheet P. In other words, by transferring the print data to the printing unit 30, the print control unit 12b causes the printing unit 30 to perform the printing on the printing medium based on the print data. A step at which the printing unit 30 performs the printing under the control of the print control unit 12b is referred to as a printing step.

Of course, a timing at which the print control unit 12b executes step S200 is after the writing of the print data by the print data generating unit 12a has progressed to some degree. For example, the print control unit 12b waits until a predetermined time period that is set in advance has elapsed from the image input at step S100, and executes step S200 at a timing at which the predetermined time period has elapsed. Alternatively, the print control unit 12b may monitor the writing of the print data into the storage unit 20, and may execute step S200 when a predetermined amount or more of the print data is accumulated in the storage unit 20. For example, when the input image data is configured by a plurality of pages, the print control unit 12b may start step S200 at a timing at which the generation of the print data and the writing into the storage unit 20 is performed for some of the plurality of pages, including the first page.

In this way, in the present embodiment, the print control unit 12b does not start step S200 after waiting for the determination of "Yes" at step S150. The print control unit 12b sequentially reads the print data that has already been written, transfers the print data to the printing unit 30, and causes the printing to be performed in parallel with the time period during which the print data generation processing by the print data generating unit 12a is performed. In other words, the print control unit 12b causes at least a part of the printing by the printing unit 30 to be performed in parallel with the generation of the print data by the print data generating unit 12a. At step S200, once the print control unit 12b reads all the print data that has been written into the storage unit 20 and not yet transferred to the printing unit 30 at that point in time, and transfers the print data to the printing unit 30, the print control unit 12b makes a determination at step S210.

At step S210, the print control unit 12b determines whether or not the processing at step S200 has been completed for the print data of the final page. In other words, when the print control unit 12b finishes transferring the print data to the printing unit 30 for all the pages configuring the input image data, the print control unit 12b determines "Yes" at step S210 and ends the print control processing. For example, the print data corresponding to a last row of the last page of the input image data may be assigned specific information indicating that this is the last print data, and the print control unit 12b may determine "Yes" at step S210 when the print data to which this specific information has been assigned is read out and transferred. On the other hand, when the processing at step S200 is not complete for the print data of the final page, the print control unit 12b determines "No" at step S210 and executes step S200 once more.

3. Conclusion

According to the present embodiment as described above, the print control device 10 is provided with the storage unit 20 that stores the color conversion LUT 80 used for color conversion, the print data generating unit 12a that generates the print data, which is the image data represented by the predetermined ink color space, by performing color conversion of the input image data while referring to the color conversion LUT 80, and the print control unit 12b that causes the printing unit 30 to perform the printing on the printing medium based on the print data. The color conversion LUT 80 defines the correspondence relationship between the combination of the temperature information T indicating the temperature of the printing medium in the printing unit 30 and the color information of the input color space, and the color information of the ink color space. The print data generating unit 12a generates the print data by referring to the color conversion LUT 80 to convert the combination of the input image data represented by the input color space and the temperature information T input from the printing unit 30, and the print control unit 12b performs at least some of the printing by the printing unit 30 in parallel with the generation of the print data by the print data generating unit 12a.

According to the above-described configuration, the print data generating unit 12a converts the combination of the input image data and the temperature information T input from the printing unit 30 using the color conversion LUT 80, and thus generates the print data. Therefore, in an environment in which the temperature of the printing medium may vary due to effects such as the ultraviolet irradiation by the UV irradiator 34, print data is obtained in which the color information, that is, the ink amount data, is adjusted in accordance with the temperature of the printing medium at that time. As a result, the color represented by the input image data that is constant regardless of the temperature of the printing medium can be reproduced on the printing medium in a stable manner in accordance with the temperature of the printing medium. Further, it is possible to eliminate the time and effort of switching the LUT to be used among the plurality of color conversion LUTs prepared in advance, as in known art, and a processing load can thus be reduced.

When a period during which the print data generating unit 12a generates the print data, and a period during which the printing unit 30 performs the printing on the basis of the generated print data are completely separate, even if the temperature of the printing medium is acquired at the time of generating the print data, since the temperature of the printing medium is not clear at the time of the printing, it is not possible to generate the appropriate print data. In other words, in a configuration in which the printing based on the print data is started after the generation of all the print data is complete, the color conversion processing using the color conversion LUT 80 according to the present embodiment does not exhibit a useful effect. In contrast, in the present embodiment, the generation of the print data by the print data generating unit 12a and the printing by the printing unit 30 are performed at least partially in parallel. In this way, the optimal print data is obtained in which the ink amount data is adjusted according to the temperature of the printing medium during the printing, and it is thus possible to provide a printing result with stable quality, from which the effect of temperature variations of the printing medium has been eliminated.

Further, according to the above description, the present embodiment discloses the printing method including the print data generating step of generating the print data that is the image data represented by the predetermined ink color space by color converting the input image data with reference to the color conversion lookup table 80, and the printing step of causing the printing unit 30 to perform the printing on the printing medium on the basis of the print data. In other words, in the print data generating step, the combination of the input image data represented by the input color space and the temperature information T input from the printing unit 30 is converted while referring to the color conversion LUT 80, and at least a part of the printing step is executed in parallel with the print data generating step.

Further, according to the present embodiment, the print control program 12 causes the processor, such as the CPU 11a or the like, to execute a print data generating function of generating the print data that is the image data represented by the predetermined ink color space, by color converting the input image data with reference to the color conversion LUT 80, and a print control function of causing the printing unit 30 to perform the printing on the printing medium, based on the print data. The print data generating function generates the print data by converting the combination of the input image data represented by the input color space and the temperature information T input from the printing unit 30 with reference to the color conversion LUT 80, and the print control function causes at least a part of the printing by the printing unit 30 to be performed in parallel with the generation of the print data by the print data generating function.

4. Modified Examples

Modified examples included in the present embodiment will be described.

When the temperature information T input from the printing unit 30 is a value outside a predetermined temperature range, the control unit 11 may interrupt the generation of the print data and the printing by the printing unit 30, and after that, may stand by until the temperature information T input from the printing unit 30 is a value within the temperature range to resume the generation of the print data and the printing by the printing unit 30.

Figure 5:
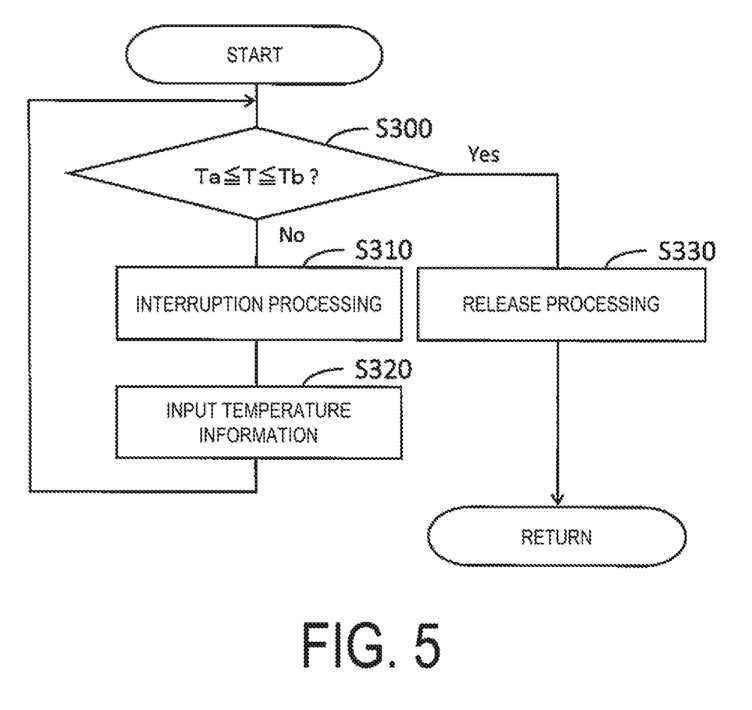
FIG. 5 is a flowchart illustrating interruption/resumption processing.

FIG. 5 illustrates, using a flowchart, interruption/resumption processing according to such a modified example. The control unit 11 starts the interruption/resumption processing illustrated in FIG. 5 triggered by the temperature information T being input from the printing unit 30 at step S110 illustrated in FIG. 3. At step S300, the print data generating unit 12a determines whether or not the currently obtained latest temperature information T is within the predetermined temperature range. A lower limit of the temperature range is a temperature Ta and an upper limit is a temperature Tb. The values of the temperatures Ta and Tb are not particularly limited, but Ta is 18° C. and Tb is 33° C., for example. The temperatures Ta and Tb can be said to be the lower limit and the upper limit of the temperature information T by which it is assumed that the appropriate ink amount corresponding to the temperature information T can be calculated using the color conversion LUT 80.

When Ta≤T≤Tb is not satisfied, the print data generating unit 12a determines "No" at step S300 and advances to step S310. On the other hand, when Ta≤T≤Tb is satisfied, the print data generating unit 12a determines "Yes" at step S300 and advances to step S330.

At step S310, the print data generating unit 12a interrupts the generation of the print data. Specifically, interrupting the generation of the print data refers to stopping the processing at steps S120 to S140. Further, the print control unit 12b instructs the printing unit 30 to interrupt the printing based on the print data. Specifically, interrupting the printing refers to stopping the processing at step S200 and stopping the operation of the transport unit 31, the printing heads 32, and the UV irradiator 34 of the printing unit 30. Step S310 is referred to as interruption processing.

After the interruption processing is performed, at step S320, the print data generating unit 12a inputs the temperature information T from the printing unit 30 in the same manner as at step S110. The print data generating unit 12a that has input the temperature information T at step S320 advances to step S300. After step S320, at step S300, of course, the print data generating unit 12a makes the determination using the temperature information T input at the immediately preceding step S320.

Note that if the interruption processing is performed at the time of the determination at step S300, the control unit 11 does nothing particular at step S310, which is the step advanced to after the determination of "No" at step S300, that is, maintains a state in which the interruption processing is performed, and advances to step S320.

At step S330, the print control unit 12b instructs the printing unit 30 to release the stopping of the operation of the transport unit 31, the printing heads 32, and the UV irradiator 34, and causes a state to be obtained in which the transport, the printing, and the ultraviolet irradiation of the sheet P can be performed. The flowchart illustrated in FIG. 5 ends after step S330 is executed. Triggered by the end of the flowchart illustrated in FIG. 5, the print data generating unit 12a executes step S120, and the print control unit 12b executes step S200 at an appropriate timing. In other words, after "Yes" is determined at step S300, ending the flowchart illustrated in FIG. 5 after step S330 is executed corresponds to releasing the interruption executed at step S310. Step S330 is referred to as release processing.

Note that when "Yes" is determined at the initial step S300 of the flowchart illustrated in FIG. 5 triggered by step S110, the control unit 11 ends the flowchart illustrated in FIG. 5 without substantially executing anything at step S330, and advances to the flowchart described in FIG. 3.

According to such a modified example, when the temperature information T that is input from the printing unit 30 and that indicates the temperature of the printing medium is too high or too low, the print control device 10 interrupts the generation of the print data and the printing by the printing unit 30 until the temperature T becomes a value that is within an appropriate temperature range. In this way, it is possible to avoid obtaining poor quality printing results.

By temporarily stopping the operation of the printing unit 30 as described above, the temperature information T that is a value outside the predetermined temperature range may naturally change to be within the temperature range. However, when the temperature information T input from the printing unit 30 is a value outside the temperature range, the print control device 10 may control the temperature adjustment unit 60, which is capable of adjusting the temperature of the printing medium in the printing unit 30 or the support unit supporting the printing medium, such that the temperature information T becomes a value within the temperature range. In the description referring to FIG. 2, the temperature adjustment unit 60 indirectly adjusts the temperature of the sheet P by adjusting the temperature of the rotating drum 54 that serves as the support unit. However, the concept of the temperature adjustment unit 60 may include a temperature adjustment unit that adjusts the temperature by directly cooling or warming the sheet P.

Specifically, when "No" is determined at step S300, when T>Tb, the print control unit 12*b* may increase an intensity of cooling by the temperature adjustment unit 60, or may stop heating by the temperature adjustment unit 60. Further, when "No" is determined at step S300, when T<Ta, the print control unit 12*b* may stop the cooling by the temperature adjustment unit 60, or may increase an intensity of the heating by the temperature adjustment unit 60. In this way, when the temperature information T is a value outside the temperature range, by controlling the temperature adjustment unit 60 to actively adjust the temperature of the printing medium, a time period of the interruption of the generation of the print data and of the printing can be shortened.

When the temperature information T input from the printing unit 30 is a value outside the temperature range, the print data generating unit 12*a* may interrupt the generation of the print data after finishing the generation of the print data in units of pages, and the print control unit 12*b* may interrupt the printing by the printing unit 30 after causing the printing unit 30 to perform the printing based on the print data in units of pages. In other words, when "No" is determined at step S300 illustrated in FIG. 5, the interruption processing at step S310 is not necessarily performed immediately. When the print data generating unit 12*a* determines "No" at step S300, when the print data generation unit 12*a* has finished generating the print data and writing the print data to the storage unit 20 up to partway through any page configuring the input image data, the processing at step S120 to step S140 may be stopped at a timing at which the generation of the print data up to the last row of the page for which the processing is partway through and the writing into the storage unit is finished, and before starting the color conversion processing for the next page.

Further, at a point in time at which the print data generating unit 12*a* determines "No" at step S300, it is assumed that the print control unit 12*b* has finished transferring the print data up to partway of the any one of the pages. In this case, the print control unit 12*b* finishes the transfer to the printing unit 30 of the print data up to the end of the page for which the transfer is partway through, and at a timing before starting the transfer of the print data relating to the next page, stops the transfer of the print data, and also instructs the printing unit 30 to stop the operation of the transport unit 31, the printing heads 32, and the irradiator 34 after finishing the printing based on the print data corresponding to the amount transferred to the printing unit 30. The printing unit 30 performs the stop processing in accordance with the instructions from the print control unit 12*b*. According to such a configuration, it is possible to avoid a change in image quality partway through the page, or damage to a printing result of a page unit due to the interruption processing.

In addition, specific aspects of the printing unit 30 are not limited to the examples described above. For example, the support unit that supports the printing medium need not necessarily by the cylindrical rotating drum 54, and it is sufficient that the support unit have a structure in which a flat surface supports the printing medium. The printing head 32 may be a so-called line head that is long in a main scanning direction that intersects the transport direction of the printing medium and that discharges ink without moving, or may be a serial type head configured to perform ink discharge while moving in the main scanning direction. The printing medium may be a continuous medium such as the sheet P illustrated in FIG. 2, or may be a page unit medium, such as single sheet paper.

The aspect in which an input parameter for the color conversion processing is the temperature T of the printing medium according to the present embodiment is also useful in an environment in which the temperature of the printing medium may vary for reasons other than the ultraviolet irradiation by the UV irradiator 34. The input color space employed by the input image data is not limited to the RGB color space, and may be, for example, a CMYK color space. The ink used by the printing unit 30 is not limited to the CMYK inks. The printing unit 30 may be, for example, a type in which ink such as orange (Or) or green (G) is used in addition to the CMYK inks. Thus, in addition to the LUT defining the conversion relationship from TRGB to CMYK as described above, an LUT defining a conversion relationship from TRGB to CMYKOrG, an LUT defining a conversion relationship from TCMYK to CMYK, or an LUT defining a conversion relationship from TCMYK to CMYKOrG, and the like can also be assumed.

What is claimed is:

1. A print control device comprising:
    a storage unit configured to store a color conversion lookup table used for color conversion;
    a print data generating unit configured to generate print data that is image data represented by a predetermined ink color space, by color converting input image data with reference to the color conversion lookup table; and
    a print control unit configured to cause a printing unit to perform printing on a printing medium, based on the print data, wherein
    the color conversion lookup table defines a correspondence relationship between color information of the ink color space, and a combination of temperature information indicating a temperature of the printing medium in the printing unit and color information of an input color space,
    the print data generating unit generates the print data by converting, with reference to the color conversion lookup table, a combination of the input image data represented by the input color space and the temperature information input from the printing unit, and
    the print control unit executes at least a part of the printing by the printing unit in parallel with the generation of the print data by the print data generating unit.

2. The print control device according to claim 1, wherein when the temperature information input from the printing unit is a value outside a predetermined temperature range, the print control device interrupts the generation of the print data and the printing by the printing unit, and subsequently, defers the generation of the print data and the printing by the printing unit until the temperature information input from the printing unit is a value within the temperature range.

3. The print control device according to claim 2, wherein when the temperature information input from the printing unit is a value outside the temperature range, the print control device controls a temperature adjustment unit configured to adjust a temperature of the printing medium in the printing unit or of a support unit supporting the printing medium so that the temperature information is a value within the temperature range.

4. The print control device according to claim 2, wherein when the temperature information input from the printing unit is a value outside the temperature range, the print data generating unit interrupts the generation of the print data after finishing the generation of the print data in units of pages, and the printing control unit interrupts the printing by the printing unit after causing the printing unit to perform the printing based on the print data in units of pages.

5. A printing method comprising:
a print data generating step of generating print data that is image data represented by a predetermined ink color space, by color converting input image data with reference to a color conversion lookup table; and
a printing step of performing printing, by a printing unit, on a printing medium, based on the print data, wherein
the color conversion lookup table defines a correspondence relationship between color information of the ink color space, and a combination of temperature information indicating a temperature of the printing medium in the printing unit and color information of an input color space, and
in the print data generating step, the print data is generated by converting, with reference to the color conversion lookup table, a combination of the input image data represented by the input color space and the temperature information input from the printing unit, and
at least a part of the printing step is executed in parallel with the print data generating step.

6. A non-transitory computer readable medium storing a print control program causing a processor to execute functions comprising:
a print data generating function of generating print data that is image data represented by a predetermined ink color space, by color converting input image data with reference to a color conversion lookup table; and
a print control function of causing a printing unit to perform printing on a printing medium, based on the print data, wherein
the color conversion lookup table defines a correspondence relationship between color information of the ink color space, and a combination of temperature information indicating a temperature of the printing medium in the printing unit and color information of an input color space,
the print data generating function generates the print data by converting, with reference to the color conversion lookup table, a combination of the input image data represented by the input color space and the temperature information input from the printing unit, and
the print control function executes at least a part of the printing by the printing unit in parallel with the generation of the print data by the print data generating unit.

* * * * *